United States Patent
Komeyama et al.

(10) Patent No.: US 7,160,192 B2
(45) Date of Patent: Jan. 9, 2007

(54) CROSS SHAFT AND CROSS SHAFT JOINT

(75) Inventors: Nobuo Komeyama, Nara (JP); Kenji Yamamoto, Ibaraki (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/729,015

(22) Filed: Dec. 8, 2003

(65) Prior Publication Data

US 2004/0114991 A1 Jun. 17, 2004

(30) Foreign Application Priority Data

Dec. 9, 2002 (JP) ............................ P.2002-356941

(51) Int. Cl.
*F16D 3/41* (2006.01)

(52) U.S. Cl. ........................ 464/14; 464/132

(58) Field of Classification Search ............ 464/11–14, 464/132, 136, 128; 384/569, 571, 586, 589, 384/126–128; 184/6.17, 6.18
See application file for complete search history.

(56) References Cited

U.S. PATENT DOCUMENTS

| 412,995 | A | * | 10/1889 | Subers ..................... 384/589 |
| 1,602,472 | A | * | 10/1926 | Woolgar, Sr. ............... 384/589 |
| 2,251,944 | A | * | 8/1941 | Knox ........................ 384/586 |
| 3,204,428 | A | * | 9/1965 | Stokely ..................... 464/14 X |
| 4,144,724 | A | * | 3/1979 | Armasow et al. ........... 464/128 |
| 4,371,357 | A | * | 2/1983 | Petrzelka et al. ........ 464/132 X |
| 4,436,516 | A | * | 3/1984 | Olschewski et al. .... 464/132 X |
| 4,445,875 | A | * | 5/1984 | Kosuda et al. ................ 464/14 |
| 4,880,405 | A | * | 11/1989 | Ende .......................... 464/14 |
| 5,342,240 | A | * | 8/1994 | Mazziotti .................... 464/11 |
| 6,716,105 | B1 | * | 4/2004 | Lindenthal et al. ..... 464/132 X |

FOREIGN PATENT DOCUMENTS

| BE | 550333 | * | 12/1959 | ................. 464/132 |
| DE | 298 24 596 U1 | | 10/2001 | |
| EP | 1 001 182 A1 | | 5/2000 | |
| FR | 2 242 003 A | | 3/1975 | |
| GB | 832784 | * | 4/1960 | ................. 464/132 |
| GB | 1 477 910 A | | 6/1977 | |
| JP | 61-141819 | | 9/1986 | |
| JP | 11-51073 | | 2/1999 | |

OTHER PUBLICATIONS

SAE Universal Joint and Driveshaft Design Manual, AE-7, Society of Automotive Engineers, Warrendale, PA, p. 64, TJ1079.S62 1979.*
SAE Universal Joint and Driveshaft Design Manual, AE-7, Society of Automotive Engineers, Warrendale, PA, p. 71, TJ1079.S62 1979.*
French Search Report dated Jun. 23, 2005 with a partial English translation.

* cited by examiner

*Primary Examiner*—Greg Binda
(74) *Attorney, Agent, or Firm*—McGinn IP Law Group, PLLC (57) ABSTRACT

Across shaft has four trunnions externally provided with roller bearings in a plurality of rows. Each of the trunnions is formed with a recess at its distal end face. A bottom region of the recess is formed in a spherical shape. An inner diameter of an opening region of the recess except the bottom region in a spherical shape is set to be gradually larger toward an opening end edge of the recess. A depth of the recess from the opening end edge to the deepest point is set to be 30 to 70% of the total length of the rollers in an axial direction. By providing this recess is a shape of a punch bowl, rigidity of each of the trunnions of the cross shaft can be reduced, while securing sufficient strength of the trunnion.

20 Claims, 8 Drawing Sheets

CROSS SHAFT AND CROSS SHAFT JOINT

BACKGROUND OF THE INVENTION

The present invention relates to a cross shaft (a spider) and a cross shaft joint.

In a torque transmission system in a vehicle or the like, a cross shaft joint has been generally employed for the purpose of connecting two rotary shafts which are provided in a non-coaxial manner, or which are provided so as to be tilted in a non-coaxial manner.

In this cross shaft joint, there has been a tendency that contact face pressure of rollers at a distal end of a trunnion of the cross shaft may increase at a time of torque transmission, and the rollers may break down where high load is applied. To avoid such break down of the rollers, the rollers are arranged in a plurality of rows in an axial direction in an annular space between an outer peripheral face of the trunnion and an outer ring cup of the roller bearing, and diameters of the rollers in respective rows are made successively larger from the distal end of the trunnion to the root thereof, thereby to substantially equalize the contact face pressure exerted on the rollers in the respective rows, at the time of torque transmission (See JP-A-11-51073, for example).

In the above described related art, the more the load at the time of torque transmission increases, the larger differences must be made between the diameters of the rollers in the respective rows. In this case, because radial clearances of the rollers which are reduced in diameter with respect to the trunnion will be made larger, the rollers become liable to skew.

Moreover, it has been proposed that a recess substantially in a shape of a frustum of a cone is formed at an end face of the trunnion of the cross shaft to reduce bending rigidity of the trunnion. For this purpose, there is an example that the trunnion will be flexed at the time of torque transmission, whereby deflection of bending stress to the root of the trunnion will be reduced (See JU-A-61-141819, for example).

However, in the above described related art, it is concerned that in case where a large recess is formed, rigidity of the trunnion with respect to the load at the time of torque transmission may be insufficient. This is an area for further improvement.

SUMMARY OF THE INVENTION

In view of above, an object of the present invention is to provide a cross shaft in which durability and reliability is improved.

In order to solve the aforesaid object, the invention is characterized by having the following arrangement.

(1) A cross shaft comprising:
  trunnion;
  rolling bearings externally provided at the trunnion in a plurality of rows in an axial direction of the trunnion; and
  a recess formed at a distal end face of the trunnion, wherein a bottom region of the recess is formed in a spherical shape, an inner diameter of an opening region of the recess except the bottom region is set to be gradually larger toward an opening end edge of the recess, a depth of the recess from the from the opening end edge to a deepest point of the bottom region is set to be 30 to 70% of a total length of the roller bearings in the axial direction.

(2) The cross shaft according to (1), wherein the trunnion is provided on an outer peripheral face thereof with a plurality of bearing rolling faces which are successively reduced in diameter from a root thereof toward a distal end thereof.

(3) The cross shaft according to (1), wherein an inner diameter of the opening end edge of the recess is set to be 50 to 80% of an outer diameter of the distal end of the trunnion, and the bottom region in the spherical shape has a central angle which is set to be 120 to 160 degree, and radius of curvature which is set to be 50% or less of the inner diameter of the opening end edge of the recess.

(4) The cross shaft according to (1), wherein the cross shaft is made of carburized steel and roller vanishing process is applied to the bearing rolling face.

(5) The cross shaft according to (1), wherein the cross shaft joint includes four of the trunnions and four roller bearings are respectively mounted on the four trunnions.

(6) The cross shaft according to (5), wherein crownings in a curved shape are formed at both ends of each of the rollers on an outer peripheral face thereof.

DETAILED DESCRIPTION OF PREFERRED EMBODIMENTS

Figure 1:
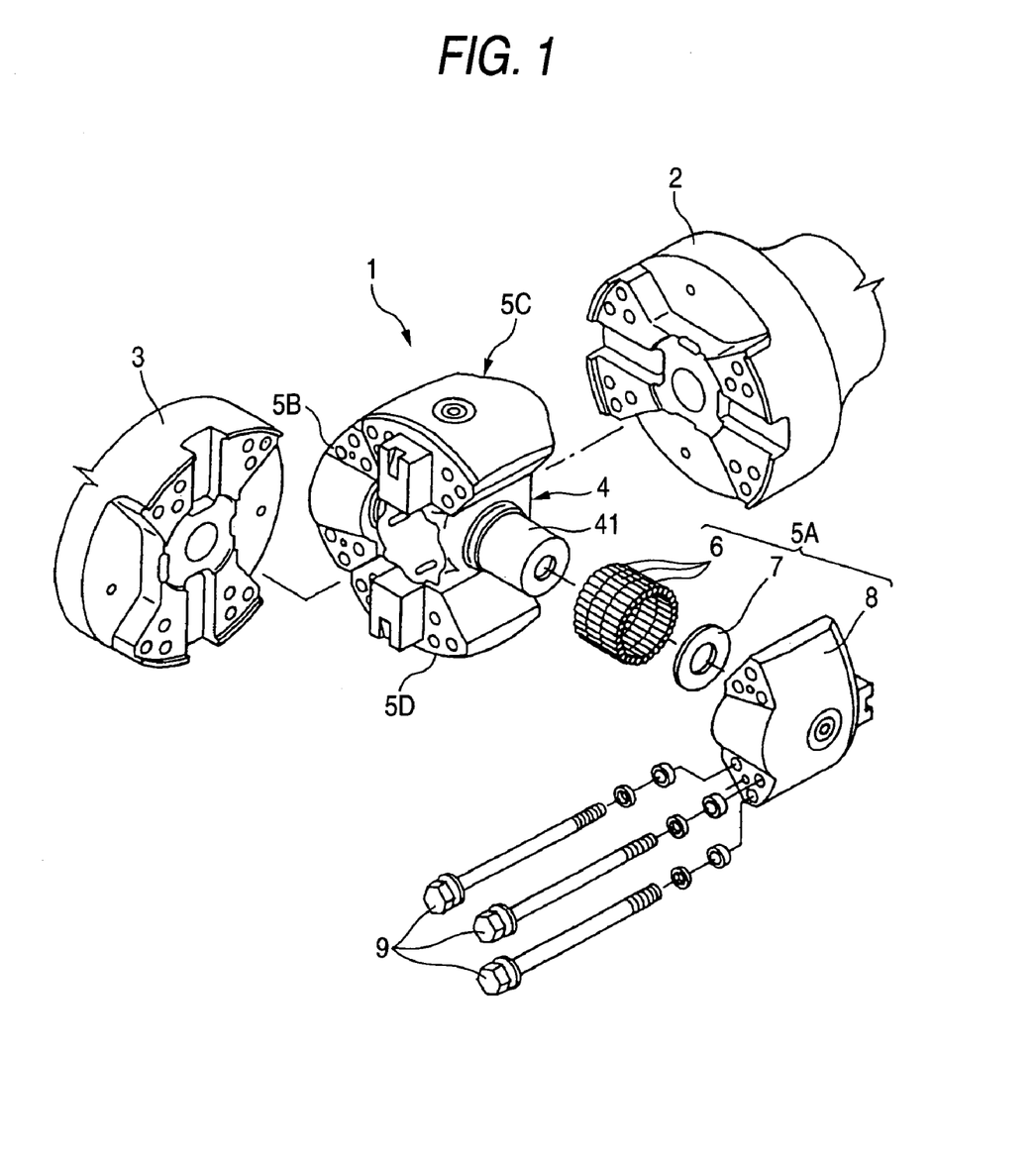
FIG. 1 is an exploded perspective view of a cross shaft joint according to one embodiment of the invention.
Figure 2:
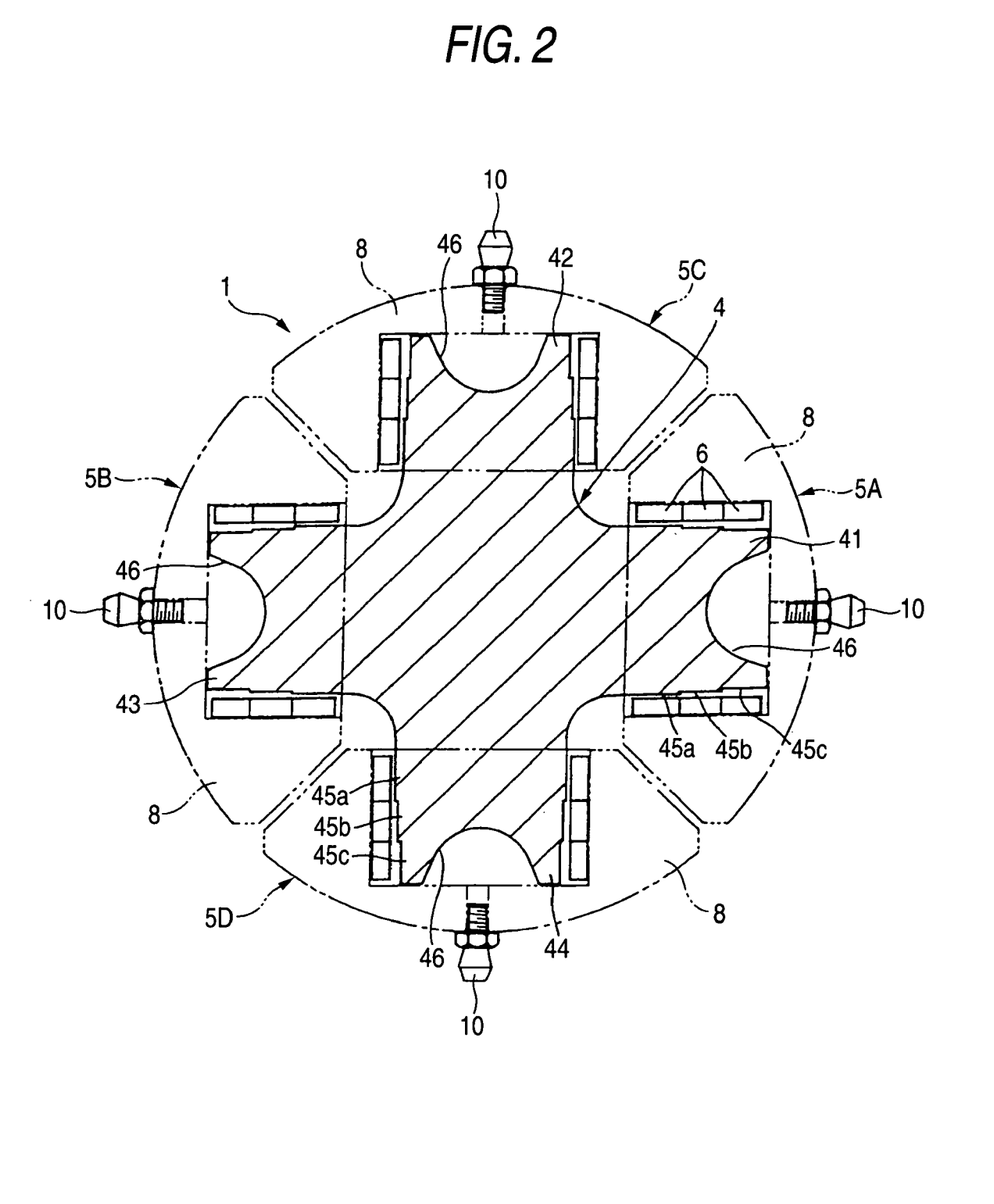
FIG. 2 is a front view showing the cross shaft joint of FIG. 1.
Figure 3:
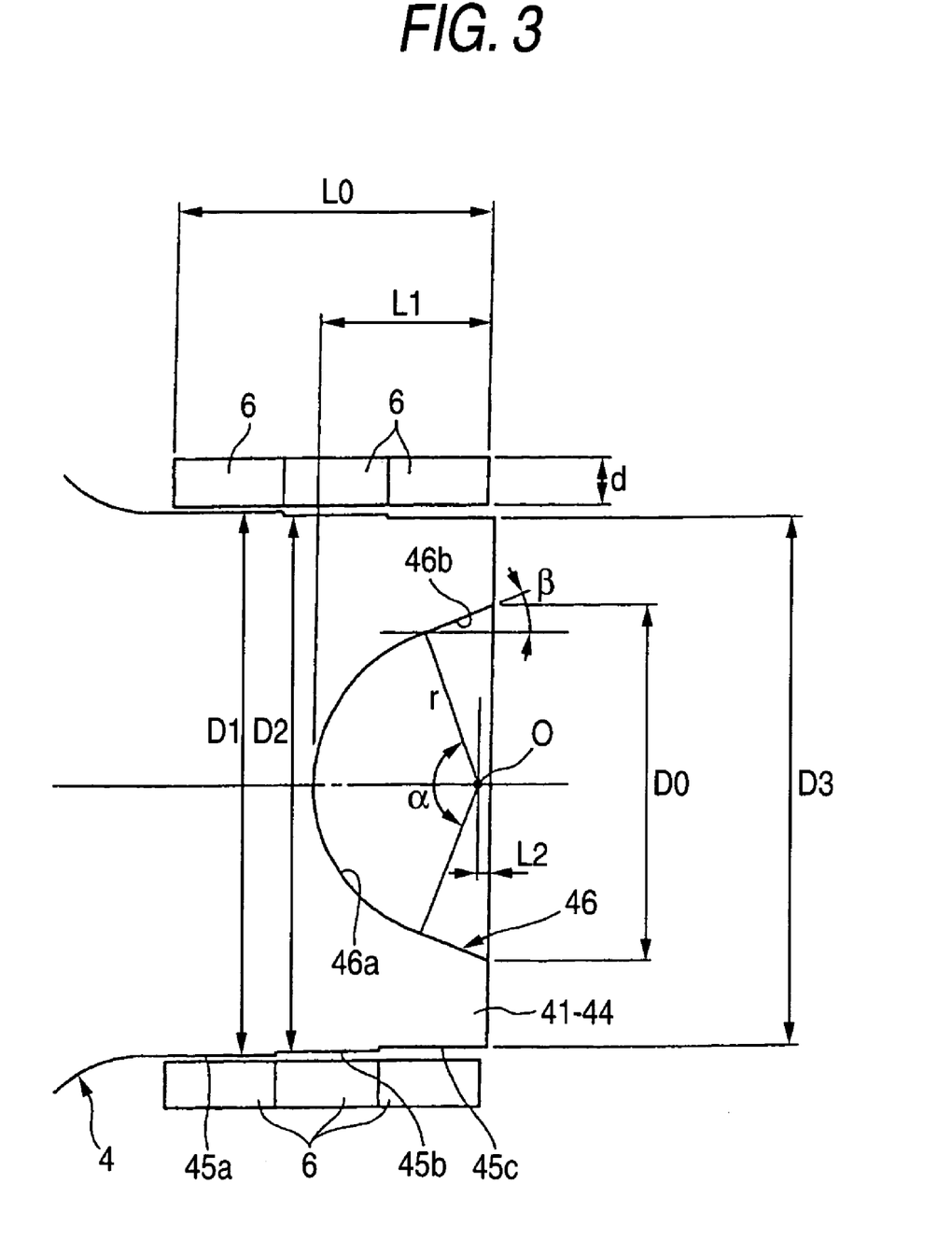
FIG. 3 is a sectional view showing a trunnion of a cross shaft.

FIGS. 1 to 3 show one embodiment of the invention. In the drawings, numeral 1 designates a cross shaft joint. This cross shaft joint 1 includes a first rotary shaft 2 and a second rotary shaft 3 which are coaxially opposed and coupled to each other tiltably so as to transmit torque.

The cross shaft joint 1 has a known structure including a cross shaft 4 and four roller bearings 5A to 5D. The cross shaft 4 has four trunnions 41 to 44.

All the four roller bearings 5A to 5D are so-called needle pin rolling bearings having exactly the same structure, each of which includes a plurality of needle pin rollers 6, a thrust bush 7 and an outer ring cup 8. Although not shown in the drawings, sealing devices may be provided between the outer cups 8 of the roller bearings 5A to 5D and the trunnions 41 to 44 of the cross shaft 4, so that a lubricant such as grease may be enclosed inside the roller bearings 5A to 5D.

The two trunnions 41, 43 of the above described cross shaft 4 which are opposed to each other at 180 degree are fitted to one end of the first rotary shaft 2 by way of the roller bearings 5A, 5B. The remaining two trunnions 42, 44 of the cross shaft 4 which are opposed to each other at 180 degree are fitted to one end of the second rotary shaft 3 by way of the roller bearings 5C, 5D.

The outer ring cups 8 of the above described roller bearings 5A to 5D are fitted to the two rotary shafts 2, 3 by means of bolts 9 or the like. Manner of fitting these outer ring cups 8 is not particularly limited, but the invention includes all the methods which are generally known. The outer ring cup 8 is provided with a grease nipple 10 for pouring the grease into the outer ring cup 8.

In this embodiment, an improvement is made to a shape of the trunnions 41 to 44, which will be described below.

Each of the roller bearings 5A to 5D has rollers 6 arranged in three rows in parallel in an axial direction. Each of the trunnions 41 to 44 of the cross shaft 4 is provided on its outer peripheral face with rolling faces 45a, 45b, 45c having respective outer diameters D1, D2 and D3 which are gradually decreased from the root toward the distal end of the trunnion, and called as larger, middle and smaller rolling faces. These rolling faces 45a to 45c of each of the trunnions 41 to 44 are arranged in three rows. Accordingly, radial clearances of the rollers 6 are gradually increased from the root toward the distal end. Differences in outer diameter between the adjacent rolling faces 45a to 45c of these trunnions 41 to 44 are set to be a value of a diameter d of the roller 6 multiplied by 0.001 to 0.005. In the drawings, the differences in the outer diameter of the rolling faces 45a to 45c of the trunnions 41 to 44 are exaggerated. By forming the rolling faces in this manner, it is advantageous that distribution of the contact face pressure exerted on the rollers 6 at the time of torque transmission is equalized, and it is also advantageous that the rollers 6 is prevented from skewing.

In addition, each of the trunnions 41 to 44 is provided with a recess 46 in a shape of a punch bowl. This recess 46 is formed at a center part of each of the trunnions 41 to 44 and opens toward an end face of the trunnion.

A bottom region 46a of the recess 46 is formed in a spherical shape. An inner diameter of an opening region 46b of this recess 46 except the bottom region 46a in the spherical shape is gradually increased toward an opening end edge of the recess 46. By providing this recess 46, a cylindrical portion existing in a distal end part of each of the trunnions 41 to 44 of the cross shaft 4 becomes gradually thinner in thickness toward its distal end.

In this embodiment, the above described recess 46 is set to meet the following requirements (1) to (5).

(1) A depth L1 of the recess 46 from the opening end edge to the deepest point is set to be 30 to 70%, preferably 50 to 60% of the total length in an axial direction of the rollers 6 which are arranged in three rows in the axial direction.

(2) An inner diameter D0 of the recess 46 at the opening end edge is set to be 50 to 80%, preferably 60 to 70% of an outer diameter D3 of each of the trunnions 41 to 44 at its distal end.

(3) A central angle α of the bottom region 46a of the recess 46 in the spherical shape is set to be 120 to 160 degree, preferably 130 to 150 degree.

(4) A radius of curvature r of the bottom region 46a of the recess 46 in the spherical shape is set to be less than 50% of the inner diameter D0 of the recess 46 at the opening end edge thereof.

(5) The opening region 46b of the recess 46 has a tapered shape. An angle β of this tapered shape of the opening region 46b is set to be 10 to 30 degree, preferably 15 to 25 degree.

With reference to the above item (5), the opening region 46b of the recess 46 may be formed in a curved shape having the inner diameter gradually increased toward the opening end edge of the recess 46.

In case where the recess 46 satisfying the above requirements (1) to (5) is provided, rigidity of each of the trunnions 41 to 44 of the cross-shaft 4 can be reduced, while sufficient strength of each of the trunnions 41 to 44 is ensured.

Figure 4:
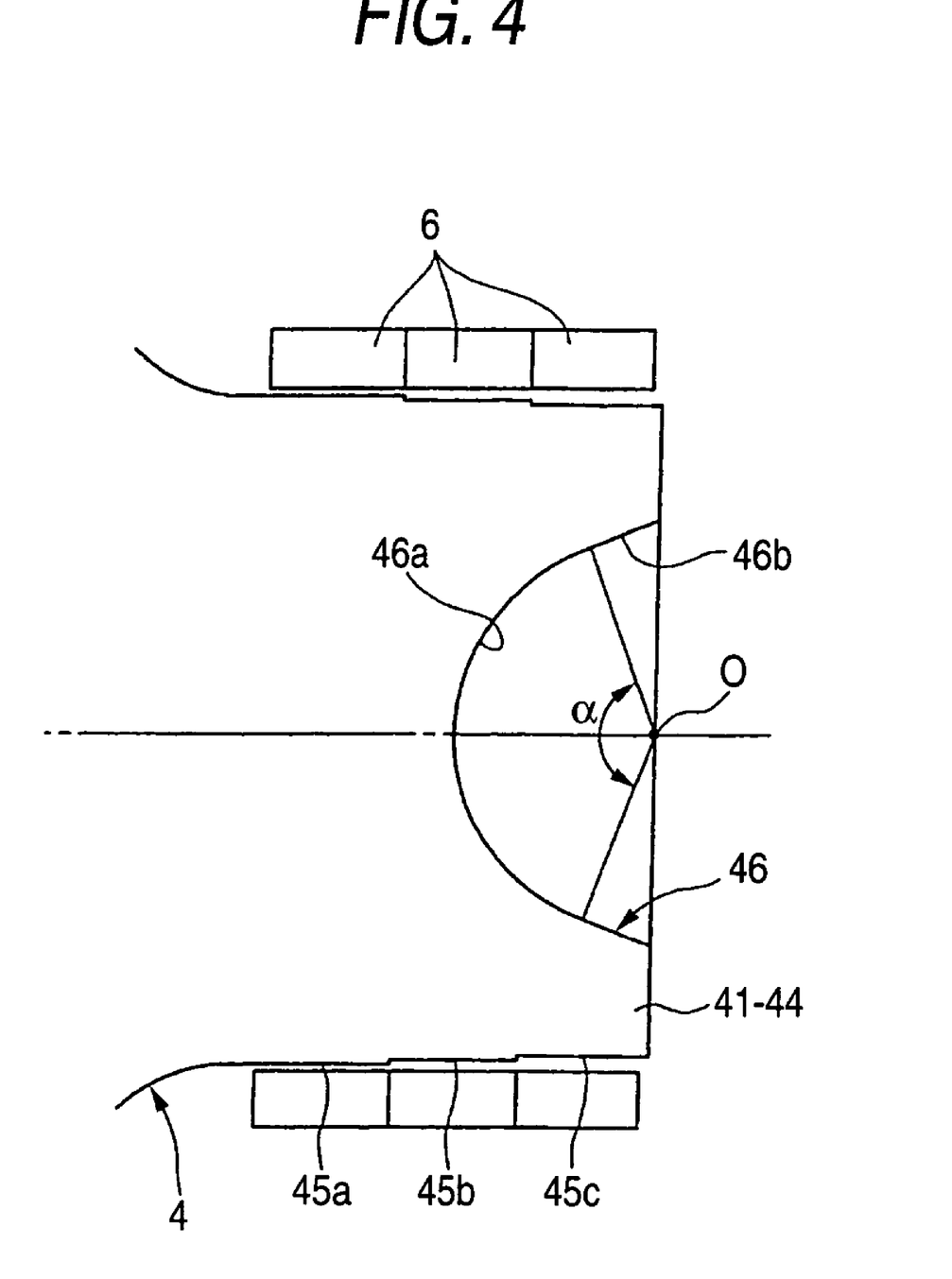
FIG. 4 is a view corresponding to FIG. 3 showing a modification of a recess of the trunnion.
Figure 5:
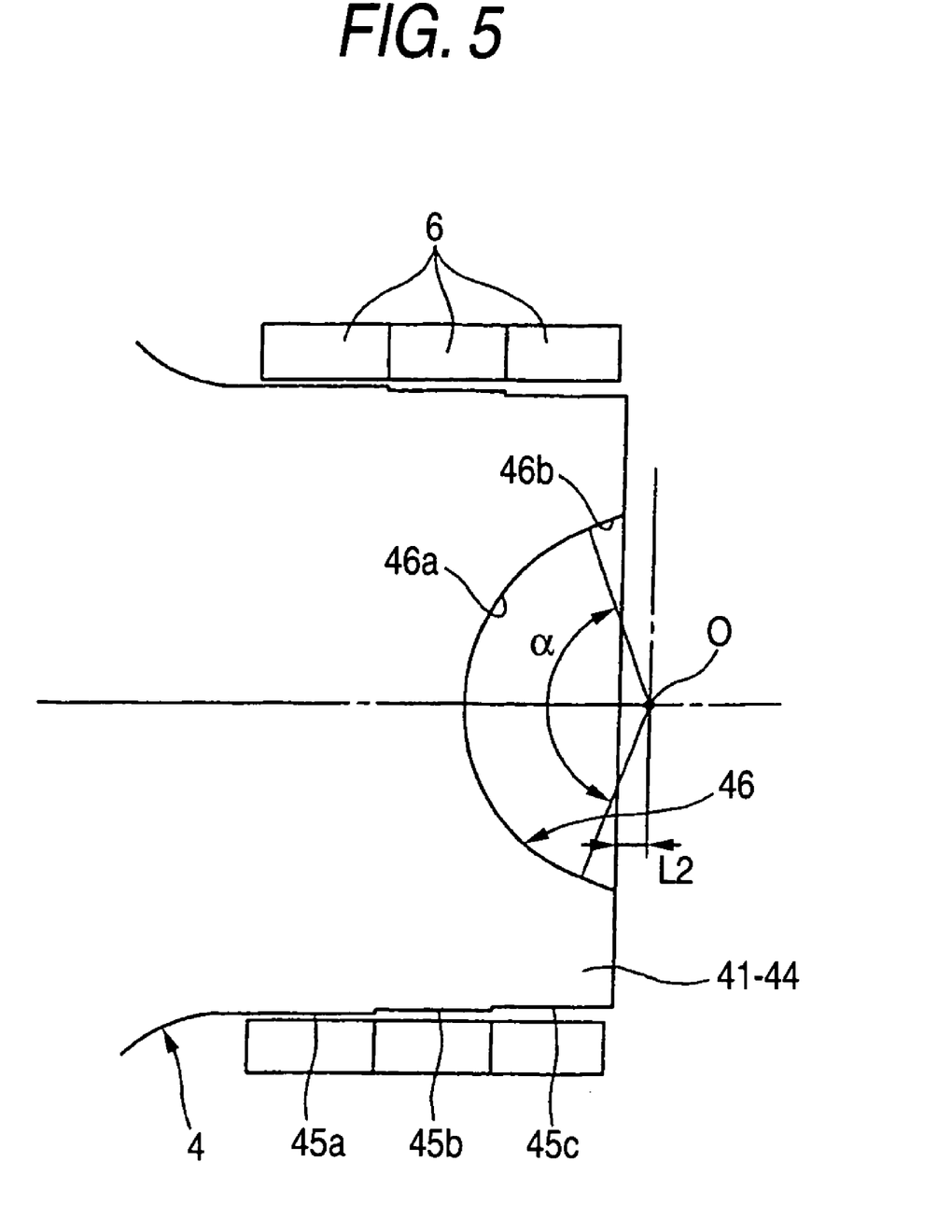
FIG. 5 is a view corresponding to FIG. 3 showing a modification of the recess of the trunnion.

Although in FIG. 3, a center of curvature O of the bottom region 46a of the recess 46 is set at a position which is deeper than the distal end of each the trunnions 41 to 44 by a determined length L2, this center of curvature O may be set at a position corresponding to the distal end of each the trunnions 41 to 44 as shown in FIG. 4, or may be set at a position protruding from the distal end of each the trunnions 41 to 44 by a determined length L2 as shown in FIG. 5.

Specifically, in the cross shaft 4 having the above described structure, since the largest bending stress is exerted on the curved part at the root of each the trunnion 41 to 44 at the time of torque transmission, each the trunnion 41 to 44 will be flexed in its entirety from the roots. As the trunnion is flexed in this manner, the rollers 6 in the respective rows are brought into contact with the respective rolling faces 45a to 45c substantially evenly at the time of torque transmission, and concentration of the contact face pressure to the edges of the rollers will be restrained. As the results, exfoliation life, bending fatigue strength of the rolling faces 45a to 45c of the trunnions 41 to 44 of the cross shaft 4 can be enhanced.

For reference, in case where the recess 46 of each the trunnion 41 to 44 is formed in a spherical shape in its entirety from the bottom region 46a up to the opening region 46b instead of forming it in the tapered shape, the largest bending stress will not act on the root of each the trunnion 41 to 44 but act on the rolling faces provided with the recess 46, and the trunnions 41 to 44 will become defective in strength.

To summarize the above description, the outer peripheral face of each of the trunnions 41 to 44 of the cross shaft 4 which functions as the rolling faces of the rollers provided in the three rows on the roller bearings 5A to 5D is formed to be reduced in diameter at three steps toward the distal end. As the results, distribution of the contact face pressure acting on the rollers 6 in the respective rows at the time of torque transmission will be equalized to the largest extent while the rollers will be prevented from skewing. In addition, each of the trunnions 41 to 44 of the cross shaft 4 is provided with the recess 46 having the above described particular structure, and therefore, each of the trunnions 41 to 44 will be flexed in its entirety from the root. As the results, the contact face pressure will be evenly distributed on the rollers 6 by synergistic effects of the above features, and contribution to enhancement of durability and reliability of the cross shaft joint can be attained.

By the way, it is possible to make the cross shaft 4 of carburized steel and apply roller vanishing process to the outer peripheral face of each of the trunnions 41 to 44 of the cross shaft 4 which functions as the rolling faces. In this case, fatigue strength of the rolling faces can be enhanced because residual compressive stress is generated on the rolling faces by the roller vanishing process, and at the same time, surface roughness of the rolling faces is improved.

Figure 8:
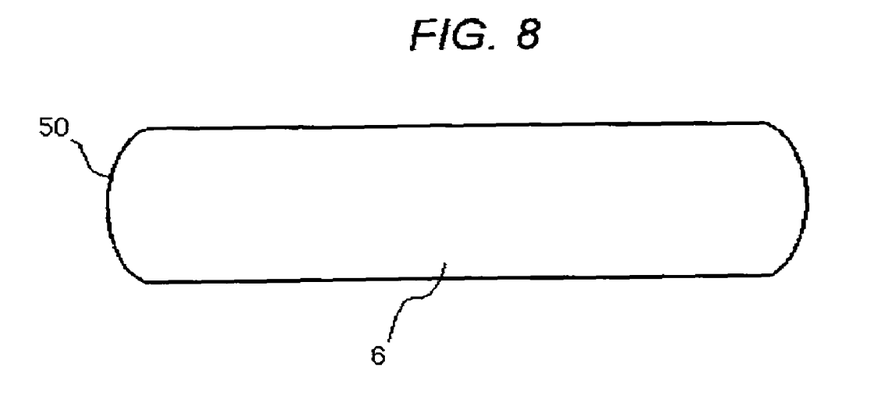
FIG. 8 is a sectional view showing an embodiment of the roller.

Moreover, as shown in FIG. 8, the above described roller 6 may be formed with crownings 50 in a curved shape at both ends thereof. In this case, concentration of the contact face pressure to the edges of the roller 6 at both ends in an axial direction can be further restrained, and the exfoliation life and bending fatigue strength of the region acting as the rolling face of the roller 6 can be enhanced.

It is to be noted that the invention is not limited to the above described embodiment, but various applications and modifications can be taken into consideration.

Figure 6:
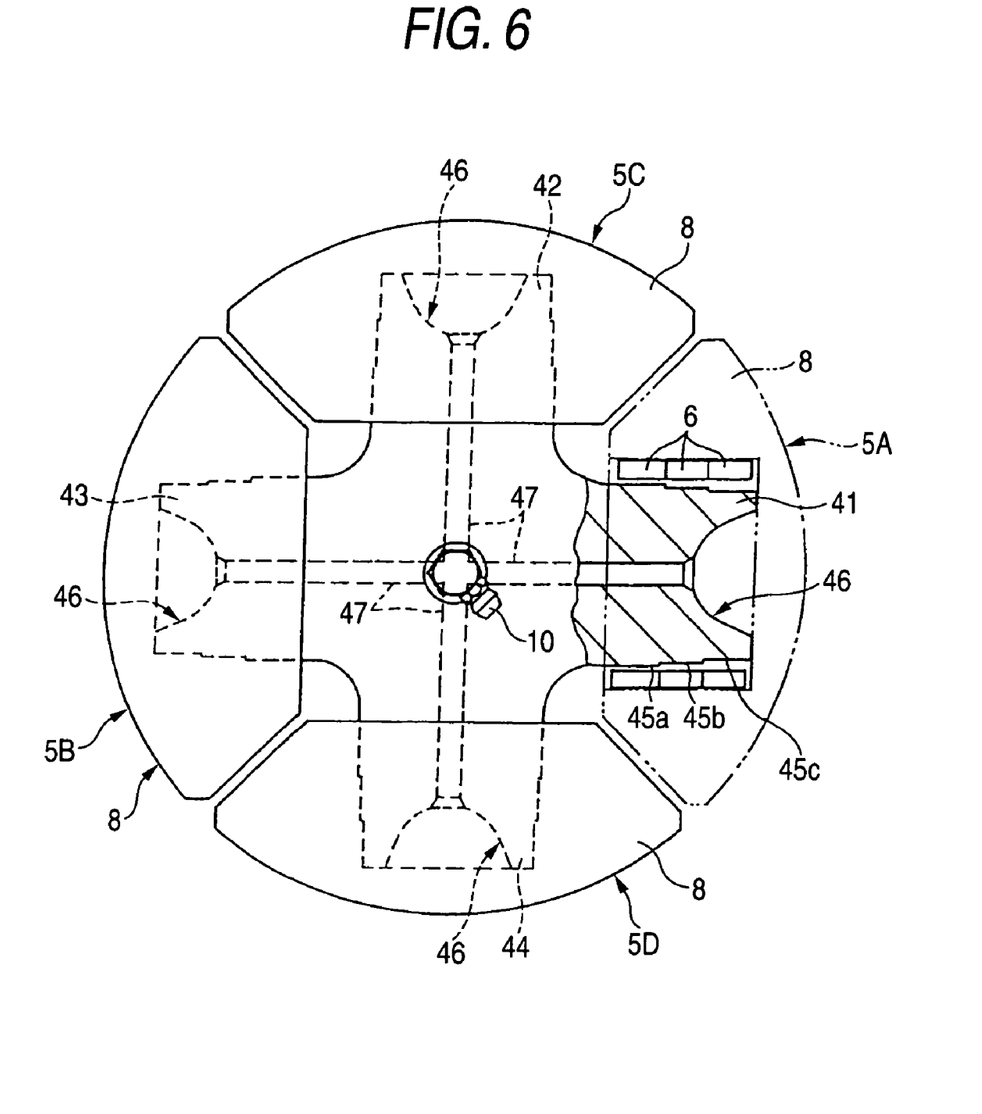
FIG. 6 is a plan view showing another embodiment of the cross shaft joint.

(1) As shown in FIG. 6, passages 47 for supplying the grease to the roller bearings 5A to 5D and for stocking the grease can be provided in an area from the center of the cross shaft 4 to the bottoms of the recesses 46 of the trunnions 41 to 44. Respective one ends of these passages 47 are open individually at the centers of the bottoms of the recesses 46 of the trunnions 41 to 44, while the other ends of the passages 47 are concentrated into one at the center part of the cross shaft 4 to be open to side way of the center part of the cross shaft 4. The grease nipple 10 for introducing the grease is mounted to an opening of the passage 47 at the center part of the cross shaft 4. The grease nipple which has been mounted to the outer ring cup 8 in FIG. 2 is omitted in FIG. 6. By introducing the grease from the grease nipple 10 by means of a grease gun or the like, the grease will be stocked in the respective passages 47 and supplied to the roller bearings 5A to 5D respectively. Particularly, the grease can be stocked in a large amount, since the recesses 46 provided in the distal end parts of the trunnions 41 to 44 can also serve as grease reservoirs.

(2) In the above described embodiment, number of the rows of the rollers 6 in each of the roller bearings 5A to 5B may be two or more. In case where the rollers 6 are provided in two rows, for example, two rolling faces, large and small are provided on the outer peripheral face of each of the trunnions 41 to 44 of the cross shaft 4. However, dimensional relation of the recess 46 is basically the same as the above described embodiment.

Figure 7:
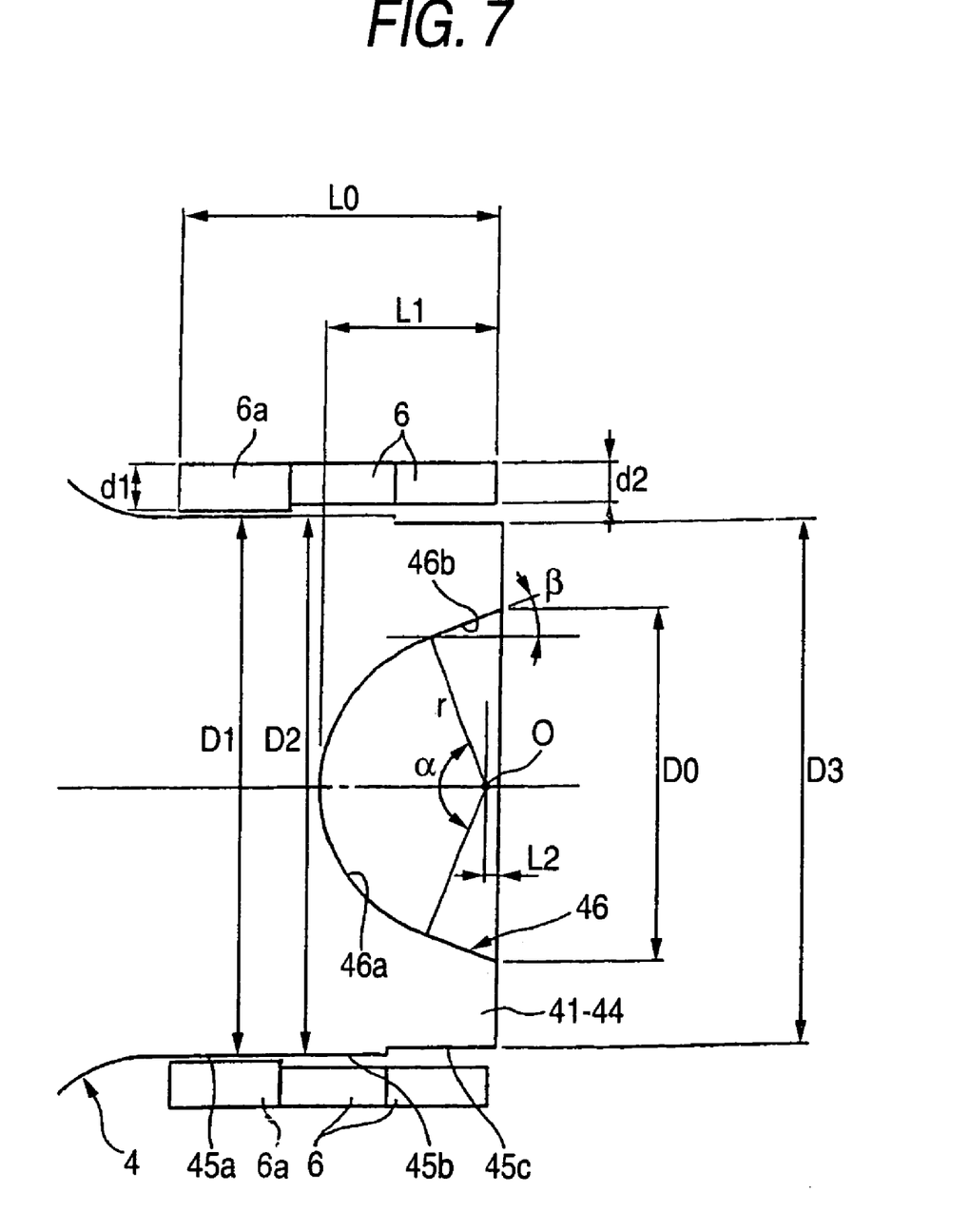
FIG. 7 is a sectional view showing another embodiment of the trunnion.

3) As shown in FIG. 7, the outer diameter D2 of each the trunnion 41 to 44 at the intermediate rolling face 45b in an axial direction may be made equal to the outer diameter D1 at the rolling face 45a at the root. Thus, the outer diameter of each the trunnion 41 to 44 can be formed in two steps, large and small, and the outer diameter d2 of the intermediate roller 6 in the axial direction and the roller 6 at the distal end can be made smaller than the outer diameter d1 of the roller 6a which is located at the root of each the trunnion 41 to 44. Both the outer diameter d2 of the intermediate roller 6 in the axial direction and the outer diameter d2 of the roller 6 at the distal end are set to be the same.

According to the cross shaft of the invention, because each of the trunnions is flexed in its entirety from the root thereof at the time of torque transmission, the exfoliation life and the bending fatigue strength in the region of the outer peripheral face of each the trunnion which functions as the rolling faces for the rollers of the roller bearing will be enhanced. In this manner, contribution to durability and reliability of the cross shaft can be attained.

Moreover, because the cross shaft joint according to the invention is constructed to include the above described cross shaft, contribution to durability and reliability of the cross shaft joint can be attained.

What is claimed is:

1. A cross shaft comprising:
   a trunnion;
   a roller bearing externally provided at the trunnion; and
   a recess formed at a distal end face of the trunnion, wherein a bottom region of the recess comprises a spherical shape and a size of an opening region of the recess except the bottom region gradually increases toward an opening end of the recess.

2. The cross shaft according to claim 1, wherein the trunnion is provided on an outer peripheral face thereof with a plurality of bearing rolling faces which are reduced in diameter from a root thereof toward a distal end thereof.

3. The cross shaft according to claim 2, wherein the cross shaft comprises carburized steel and a roller burnishing process is applied to the bearing rolling face.

4. The cross shaft according to claim 1, wherein an inner diameter of the opening end edge of the recess is in a range from about 50% to 80% of an outer diameter of the distal end of the trunnion.

5. The cross shaft according to claim 1, wherein the cross shaft comprises four trunnions and four roller bearings respectively mounted on the four trunnions.

6. The cross shaft according to claim 1, wherein the roller bearing comprises rollers arranged in a plurality of rows in parallel in an axial direction of the trunnion and crownings in a curved shape are formed at both ends of each of the rollers on an outer peripheral face thereof.

7. The cross shaft according to claim 1, wherein the bottom region has a central angle which is in a range from about 120 degrees to 160 degrees.

8. The cross shaft according to claim 1, wherein the bottom region has a radius of curvature which is 50% or less of the inner diameter of the opening end edge of the recess.

9. The cross shaft according to claim 1, wherein a depth of the recess from the opening end edge to a deepest point of the bottom region is in a range from about 30% to 70% of a total length of the roller bearing in the axial direction.

10. The cross shaft according to claim 1, wherein the opening region of the recess comprises a curved shape having an inner diameter gradually increasing toward the opening end of the recess.

11. The cross shaft according to claim 1, wherein the opening region of the recess comprises a tapered shape opening toward the opening end of the recess.

12. A cross shaft comprising:
    a trunnion;
    a roller bearing externally provided on the trunnion comprising rollers arranged in a plurality of rows in parallel in an axial direction of the trunnion;
    a plurality of bearing rolling faces corresponding to the plurality of rows of rollers provided on an outer peripheral face of the trunnion reduced in diameter from a root of the trunnion toward a distal end of the trunnion; and
    a recess formed at a distal end face of the trunnion, wherein the recess comprises a bottom region comprising a spherical shape and an opening region comprising a tapered shape opening toward an opening end edge of the recess.

13. The cross shaft according to claim 12, wherein a depth of the recess from the from the opening end edge to a deepest point of the bottom region is in a range from about 30% to 70% of a total length of the roller bearing in the axial direction.

14. The cross shaft according to claim 12, wherein the bottom region in the spherical shape has a central angle which is in a range from about 120 degrees to 160 degrees.

15. The cross shaft according to claim 12, wherein the bottom region in the spherical shape has a radius of curvature which is 50% or less of the inner diameter of the opening end edge of the recess.

16. The cross shaft according to claim 12, wherein an angle of the tapered shape of the opening region is in a range from about 10 degrees to 30 degrees.

17. The cross shaft according to claim 12, wherein a difference in outer diameters of adjacent rolling faces within the plurality of bearing rolling faces is in a range from about 0.1% to 0.5% of a diameter of the rollers.

18. The cross shaft according to claim 12, wherein a radial clearance between the rollers and the rolling faces of each of the plurality of rows is increased from the root of the trunnion toward the distal end of the trunnion.

19. A cross shaft comprising:
- a trunnion;
- a roller bearing externally provided on the trunnion comprising rollers arranged in a plurality of rows in parallel in an axial direction of the trunnion; and
- a plurality of bearing rolling faces corresponding to the plurality of rows of rollers provided on an outer peripheral face of the trunnion, the plurality of bearing rolling faces being reduced in diameter from a root of the trunnion toward a distal end of the trunnion,
- wherein a radial clearance between the rollers and the rolling faces is increased for each of the plurality of rows from the root of the trunnion toward the distal end of the trunnion and diameters of the rollers comprising the roller bearing are the same.

20. The cross shaft according to claim 19, wherein a difference in outer diameters of adjacent rolling faces is in a range from about 0.1% to 0.5% of a diameter of the rollers.

* * * * *